(12) United States Patent
Antonsson

(10) Patent No.: US 7,070,204 B1
(45) Date of Patent: Jul. 4, 2006

(54) PROGRAMMABLE GAS GENERATOR USING MICROCELLS

(75) Inventor: Erik K. Antonsson, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 800 days.

(21) Appl. No.: 09/670,908

(22) Filed: Sep. 28, 2000

Related U.S. Application Data

(60) Provisional application No. 60/170,130, filed on Dec. 10, 1999, provisional application No. 60/159,931, filed on Oct. 14, 1999, provisional application No. 60/159,943, filed on Oct. 14, 1999, provisional application No. 60/156,629, filed on Sep. 28, 1999.

(51) Int. Cl.
B60R 21/26 (2006.01)

(52) U.S. Cl. .................. 280/741; 280/742; 102/200; 102/202; 102/500

(58) Field of Classification Search ............... 280/735, 280/736, 741, 737, 742; 102/200, 202, 500
See application file for complete search history.

(56) References Cited

U.S. PATENT DOCUMENTS

| | | | | |
|---|---|---|---|---|
| 3,858,392 A | * | 1/1975 | Evans et al. .................. 60/637 |
| 6,532,408 B1 | * | 3/2003 | Breed .......................... 701/45 |
| 6,823,670 B1 | * | 11/2004 | Simburger et al. ............ 60/409 |
| 6,851,259 B1 | * | 2/2005 | Simburger et al. ............ 60/409 |

* cited by examiner

Primary Examiner—Paul N. Dickson
Assistant Examiner—Toan To
(74) Attorney, Agent, or Firm—Fish & Richardson P.C.

(57) ABSTRACT

A programmable gas generator which has a plurality of different elements can be individually activated, and wherein the activation causes inflation of a device.

15 Claims, 4 Drawing Sheets

PROGRAMMABLE GAS GENERATOR USING MICROCELLS

The present application claims priority under 35 USC 120 from provisional application No. 60/156,629, filed Sep. 28, 1999; 60/159,931, filed Oct. 14, 1999; 60/170,130, filed Dec. 10, 1999; and 60/159,943; filed Oct. 14, 1999.

BACKGROUND

Many different applications use gas generation. A few of these applications include thrusters for satellites, air bags, cylinders, hydraulics and the like.

SUMMARY

The present application teaches programmable microcells which provide programmable amounts of gas generation. A controller selects which of the programmable cells will fire at any given time.

The system enables precise control of the rate, timing and amount of gas that is generated. This can be used in combination with sensors to select one of a plurality of stored profiles.

BRIEF DESCRIPTION OF THE DRAWINGS

These and other aspects will be described in detail with respect to the accompanying drawings wherein.

DETAILED DESCRIPTION

The present application shows and describes a number of different forms of programmable gas generators.

Figure 1:
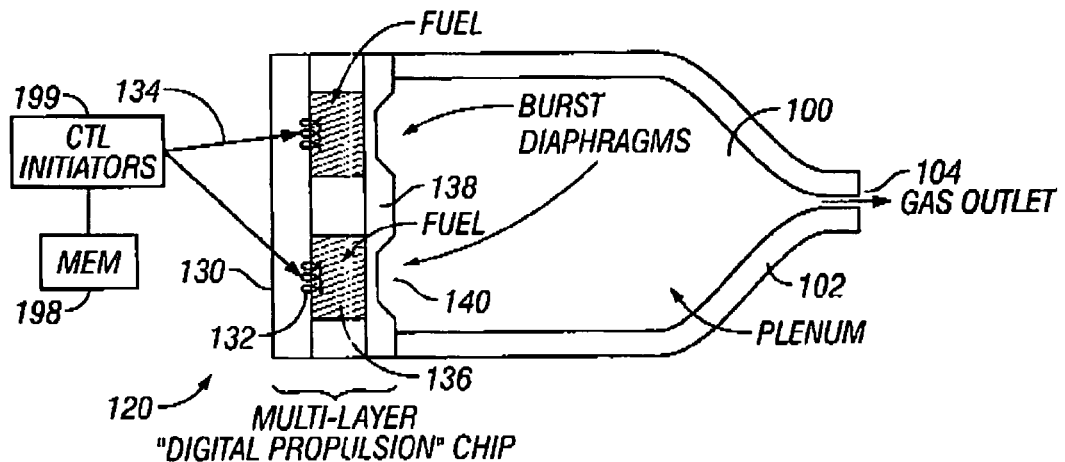
FIG. 1 shows a basic programmable gas generator.

FIG. 1 shows an embodiment in which a plenum 100 is formed by walls of a cavity 102. The walls of the cavity 102 terminate in a gas outlet 104 which can feed any of the above-described applications—e.g., thrusters for satellites, air bags, cylinders and/or hydraulics. Each initiation produces a measured amount of gas at the gas outlet 104.

A digital propulsion chip 120 is formed from the plurality of units 130. Each unit includes an initiator 132 connected to its own initiation line 134. The initiator 132 is connected to activate a fuel element 136, which can be a solid fuel element, for example.

A cover layer 138 includes bursting spots 140, each of which being a spot where the strength of the diaphragm is intentionally degraded. The gas exhausts from the bursting spot when the propulsion chamber is ignited, and the diaphragm is pierced by the expanding gas.

In operation, the initiators can be individually initiated to produce gas output. Each initiator produces a known amount of gas output, which may be constant to within a specified resolution. The position of exhaust gas to the elements is also known.

The controller 199 controls how many initiators to execute, and may also controls them in a specified order. The controller may also include a non volatile memory 198, which keeps track of which initiators have been operated. The controller can be a processor or digital computing device.

Figure 2:
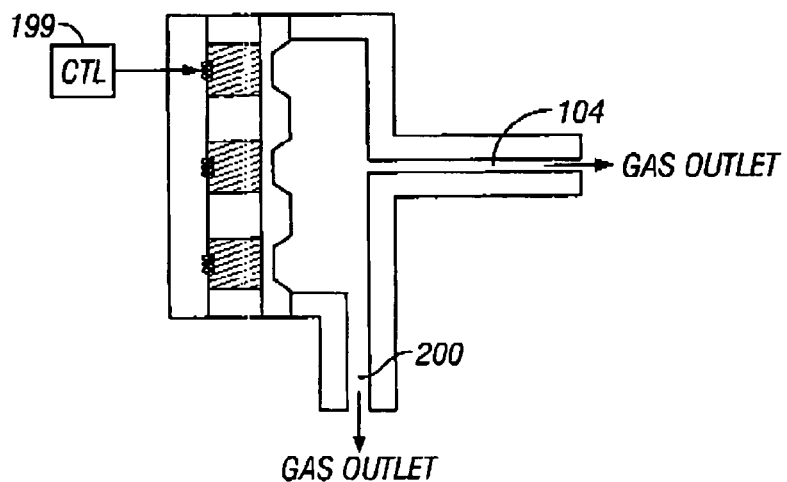
FIG. 2 shows a system with two gas outlets.

FIG. 2 shows an alternative system in which there are two gas outlets 104 and 200.

Figure 3:
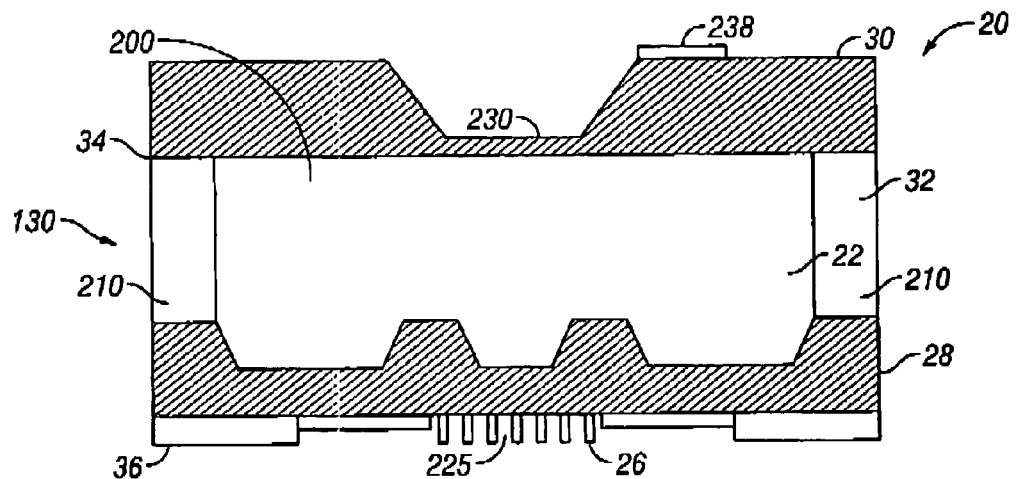
FIG. 3 shows a basic cell of propellant.

FIG. 3 shows a more detailed embodiment of a single gas generation unit 130. Each of the units include a housing portion 200 which is substantially filled with propellant. A glass spacer part 210 forms the walls which contain the propellant in the housing. A resistor 225 heats up to ignite the propellant. Once ignited, the propellant expands through burst portion 230 in the diaphragm. A metal trace 238 is also provided to restrain debris from going to undesired locations.

Figure 4:
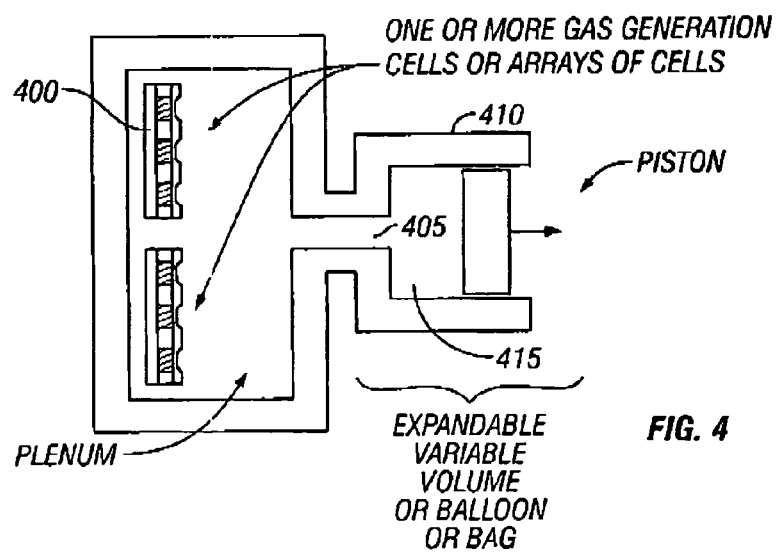
FIG. 4 shows a system driving a cylinder.

An alternative embodiment is shown in FIG. 4, in which the device is 400 are located in a cavity whose outlet 405 drives a piston 410. The volume 415 within the piston controls the movement of the piston. By expanding the volume, the piston moves, thereby producing a programmable amount of work.

Figure 5:
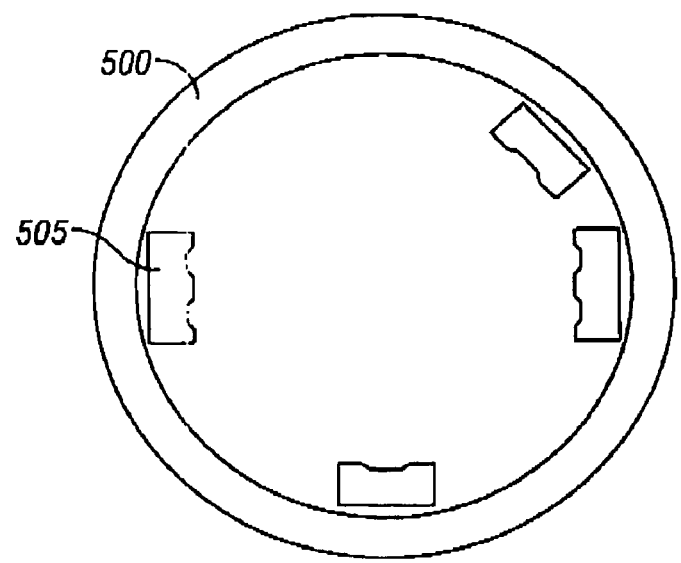
FIG. 5 shows a cylindrical system.

FIG. 5 shows another embodiment which is formed by a cylindrical plenum. One or more gas generators 505 are located around the outside of the cylindrical plenum. The gas generators are arranged circumferentially around the edges of the chamber. A plurality of gas generators around the periphery may allow better distribution of the produced gas amounts.

Figure 6:
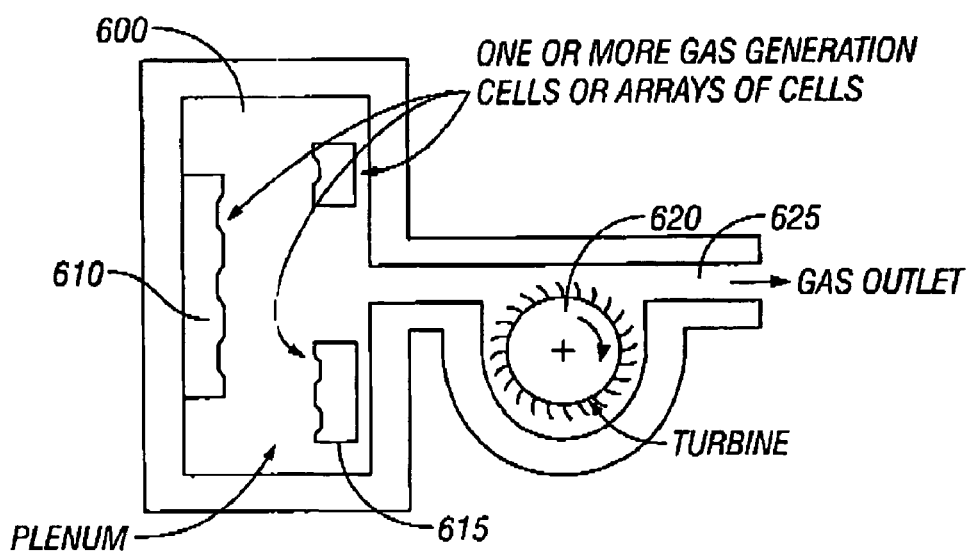
FIG. 6 shows a system driving a turbine.

FIG. 6 shows the plenum 600, with gas generation elements being located on opposite surfaces, e.g., on the surface 610 and on the opposing surface 615. The generation elements drive a turbine 620, which turns to produce some work or some indication of the amount of gas output. The gas is then outlet through the outlet 625.

The programmability in this system can be achieved by selecting the number and order of activation, in order to select the timing rate and amount of gas that is generated. The controller can calculate the amount of gas to be produced, and can ignite the specified cells to produce the gas output.

One or more sensors may be integrated with or used in conjunction with one or more of the programmable gas generators. This can be used, for example, to select or modulate the timing rate, amount or profile of gas generation as a function of time. The controller 199 includes a microprocessor which may compute a timing rate amount or profile of gas generator adjacent as a function of time prior to, during or after the acceleration.

In one specific use, different scenarios can be modeled in advance. An ideal gas production profile for each scenario is obtained from the modeling, and is stored in the controller 199.

At any time, current information is compared against the scenarios in memory, and a best match scenario is selected. That best match is used to produce a gas production profile.

Figure 7:
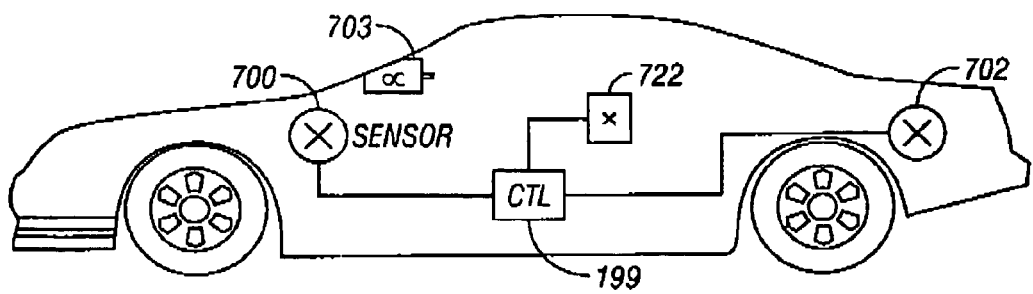
FIG. 7 shows an airbag embodiment, with a programmable device in a vehicle, which includes sensors, controlling the output and profile of airbag deployment.
Figure 8:
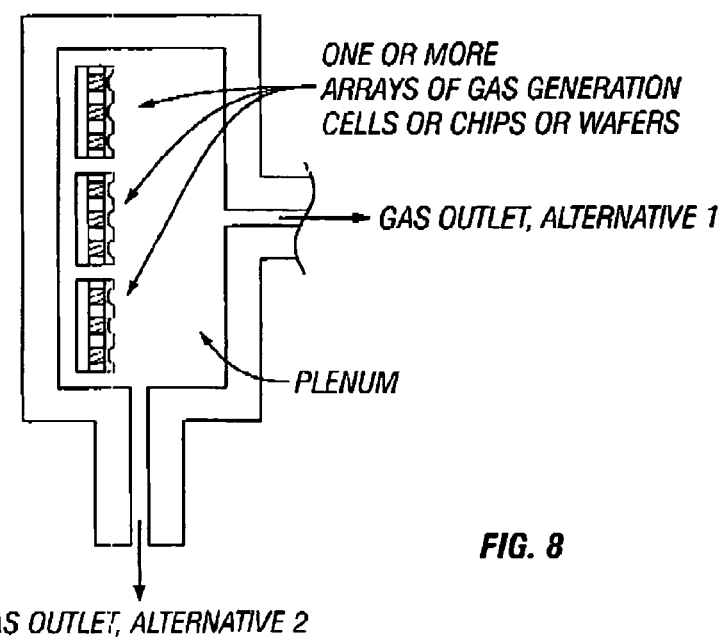
FIG. 8 shows an alternative version of the gas outlet of FIG. 4.

An embodiment shown in FIG. 7 uses a programmable gas generation chip that drives an airbag deployment device 703. One or more acceleration sensors 700, 702 may determine the severity of acceleration or deceleration of an automobile. This information is coupled to the controller 199 which has a look up table storing amounts of deceleration correlated with expected severity of a crash and ideal airbag deployment for that severity. The amount of deceleration selects the profile of airbag deployment; e.g., the amount and speed of opening of the air bag information.

This is then used to generate an air bag inflation which is matched to the profile of the current deceleration/acceleration.

Other sensors 722 may determine the speed of the vehicle at the time of the acceleration, the weight of the vehicle, seat position, thermal sensors which detect the presence or size of the passenger in the vehicle; rate or proximity sensors may also detect information such as proximity or rate of approach, etc. Data from each of these sensors can be included into the controller; and used to set the profile of the airbag deployment.

Although only a few embodiments have been disclosed in detail above, other modifications are possible.

What is claimed is:

1. A programmable gas generator, comprising:
   a controller, receiving information indicating an amount of gas to be generated; and
   a programmable multipart propulsion chip, having a plurality of individually accessible gas generation elements, each of which is accessible to produce a gas output, and each of which, once activated, produces a measured amount of gas, said chip being activated by said controller based on said amount of gas to be generated.

2. A generator as in claim 1, wherein said propulsion chip is used to drive an air bag, and wherein said controller includes a sensor which senses at least one parameter.

3. A generator as in claim 1, wherein each said element includes a debris restraining part.

4. A generator as in claim 1, wherein said plurality of elements are located on opposing surfaces.

5. A generator as in claim 1 further comprising a cylindrical chamber, wherein said plurality of elements are circumferentially spaced from one another.

6. A generator as in claim 1, further comprising storing a plurality of profiles of air bag deployment to drive said individually accessible gas generation elements, sensing current characteristics, and selecting one of said profiles and using said one profile to drive the elements.

7. A generator as in claim 1 wherein each of said gas generation elements includes a bursting spot, having a strength which is intentionally degraded, so that the element bursts at said bursting spot.

8. A generator as in claim 1, wherein said plurality of gas generation elements are arranged in a circumferential direction.

9. A generator as in claim 1, further comprising a cylindrical combustion chamber, containing said gas generation elements.

10. A generator as in claim 9, wherein said combustion chamber has at least one cylindrical wall, and further comprising placing said said gas generation elements against a wall of said cylindrical combustion chamber.

11. A method of operating an airbag, comprising:
   providing a plurality of sensors in an vehicle, each said sensor sensing a characteristic of operation of the installed vehicle;
   providing a programmable propulsion chip, which produces an amount of gas output indicative of a control that is applied thereto, wherein said amount is controllable on individual unit basis; and
   storing a plurality of airbag inflation profiles and selecting one of said profiles based on said sensor characteristic.

12. A method as in claim 11 wherein said sensors include an acceleration sensor.

13. A method as in claim 11 wherein said sensors include a weight sensor.

14. A method as in claim 11 wherein said sensors include a sensor which senses positions of different bodies within the vehicle.

15. An airbag deployment system, comprising:
   a sensor, sensing at least a deceleration of the vehicle;
   a memory, storing a plurality of profiles of airbag deployment, said plurality of profiles based on a kind of deceleration and ideal profiles for said kind of deceleration; and
   a programmable multipart propulsion chip, having a plurality of elements each of which is individually accessible to produce measured gas output, said propulsion chip being driven by said profiles to produce a gas output based on said profiles.

* * * * *